(12) United States Patent
Park

(10) Patent No.: US 12,083,867 B2
(45) Date of Patent: Sep. 10, 2024

(54) AIR VENT FOR AUTOMOBILE

(71) Applicant: HYUNDAI MOBIS CO., LTD., Seoul (KR)

(72) Inventor: Chan Young Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 260 days.

(21) Appl. No.: 17/697,159

(22) Filed: Mar. 17, 2022

(65) Prior Publication Data

US 2023/0202264 A1     Jun. 29, 2023

(30) Foreign Application Priority Data

Dec. 28, 2021 (KR) .................. 10-2021-0189847

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC ............... B60H 1/3421; B60H 2001/3471
USPC .......................................... 454/155
See application file for complete search history.

(56) References Cited

U.S. PATENT DOCUMENTS

| | | | |
|---|---|---|---|
| 6,533,655 B2 * | 3/2003 | Demerath | B60H 1/3421 454/155 |
| 9,919,586 B2 * | 3/2018 | Belzons | B60H 1/3421 |
| 10,054,332 B2 * | 8/2018 | Suzuki | F24F 13/15 |
| 10,807,443 B2 * | 10/2020 | Stiver | B60H 1/3421 |
| 11,351,844 B2 * | 6/2022 | Matsuzawa | B60H 1/3435 |
| 2012/0291893 A1 | 11/2012 | Yamamoto et al. | |
| 2017/0259649 A1 * | 9/2017 | Shibata | B60H 1/3421 |

FOREIGN PATENT DOCUMENTS

| | | |
|---|---|---|
| JP | 2009-018634 A | 1/2009 |
| JP | 2014-210502 A | 11/2014 |
| KR | 10-2110320 B1 | 5/2020 |
| KR | 10-2162869 B1 | 10/2020 |

OTHER PUBLICATIONS

Extended European Search Report issued in corresponding European Patent Application No. 22162130.3 dated Aug. 23, 2022.
Office Action issued in corresponding Korean Patent Application No. 10-2021-0189847 dated Jul. 28, 2023, with English translation.

* cited by examiner

*Primary Examiner* — Avinash A Savani
*Assistant Examiner* — Dana K Tighe
(74) *Attorney, Agent, or Firm* — MORGAN, LEWIS & BOCKIUS LLP

(57) ABSTRACT

Disclosed is an air vent for an automobile that is structurally improved so that an outlet is slimed down. The air vent for an automobile includes a duct housing configured to guide a flow of air and having an outlet formed therein, a first wing and a second wing disposed to be spaced apart from each other inside the duct housing, a link configured to control a rotation of each of the first wing and the second wing, and a handle unit coupled to the link and configured to control a movement of the link, wherein the link is disposed to be movable and rotatable inside the first wing.

20 Claims, 22 Drawing Sheets

AIR VENT FOR AUTOMOBILE

CROSS-REFERENCE TO RELATED APPLICATION

This application claims priority to and the benefit of Korean Patent Application No. 10-2021-0189847, filed on Dec. 28, 2021, the disclosure of which is incorporated herein by reference in its entirety.

BACKGROUND

1. Technical Field

The present disclosure relates to an air vent for an automobile.

2. Discussion of Related Art

An automobile is equipped with an air conditioner for controlling interior air temperature and ventilation. The air conditioner generates warm air in the winter season to keep the interior of the automobile warm, and generates cold air in the summer season to keep the interior of the automobile cool.

The air conditioner may include an air conditioning unit configured to control the temperature of air through heat exchange between the air and a heat exchange medium, and a blower unit configured to supply the air to the air conditioning unit. The automobile may provide the conditioned air to the interior of the automobile through an air vent connected to the air conditioning unit.

A conventional air vent may include a front wing configured to control a leftward and rightward wind direction and a rear wing configured to control an upward and downward wind direction.

However, in the conventional air vent, the rear wing may be disposed at a position close to an outlet through which air is discharged. Accordingly, since an operating radius of the rear wing according to upward and downward rotation of the rear wing and an operating radius of a structure configured to control the rotation of the rear wing should be secured, slimness of the outlet may not be achieved.

Further, ease of operation of a knob is reduced due to a complicated structure for operating the structure.

SUMMARY

An embodiment provides an air vent for an automobile that is structurally improved so that an outlet is slimed down.

Further, an embodiment provides an air vent for an automobile that is structurally improved so that ease of operation of a knob is improved.

Further, an embodiment provides an air vent for an automobile that is structurally improved so that an operational structure thereof is simplified.

One aspect of the present disclosure provides an air vent for an automobile including a duct housing configured to guide a flow of air and having an outlet formed therein, a first wing and a second wing disposed to be spaced apart from each other inside the duct housing, a link configured to control a rotation of each of the first wing and the second wing, and a handle unit coupled to the link and configured to control a movement of the link, in which the link is disposed to be movable and rotatable inside the first wing.

When viewed from the outlet, the first wing and the second wing may be disposed to cross each other.

The link may include a first link body disposed inside the first wing to be movable in a first direction that is a left-right direction, and a second link body extending toward the second wing from the first link body.

The link may include a first rotating shaft formed to protrude from an end portion of the first direction side of the first link body, and the first link body may rotate about the first rotating shaft in conjunction with a rotation of the handle unit about the first direction.

The second wing may include a second wing body and a guide member to which a one-side end portion of the second link body is coupled, and the one-side end portion of the second link body may be coupled to the guide member such that the second link body is slidably movable.

The second wing may include a hole formed in the second wing body.

The second wing may rotate in conjunction with a movement of the second link body in the first direction.

The link may further include a coupling block integrally formed with the first link body, and a one-side end portion of the handle unit may be rotatably disposed in the coupling block.

The first wing may rotate about the first rotating shaft in conjunction with the rotation of the first link body.

The first wing may include a first wing body, a groove formed on one side of the first wing body, and a link hole formed to pass through the first wing body in a second direction that is a flow direction of the air, in which the first link body may be disposed in the groove, the second link body may be disposed in the link hole, and the link hole may be formed to have a predetermined width (W) in the first direction.

The second link body may move in conjunction with a movement of the first link body in the first direction within a range of the width (W).

The handle unit may include a fixed block coupled to the outlet of the duct housing, a rotating block rotatably coupled to the fixed block, and a knob coupled to the rotating block to be slidably movable in the first direction with respect to the rotating block, in which an end portion of the knob may be rotatably coupled to the coupling block.

The knob may include a block receiving groove formed to receive the rotating block therein, and a width of the block receiving groove in the first direction may be greater than a width of the rotating block in the first direction.

The duct housing may further include a fixing groove disposed on an inner surface thereof and formed on a side of the outlet, and the fixing groove may be coupled to the fixed block and support the fixed block.

The link may further include a locking protrusion formed to protrude from the first link body, the first wing may further include a locking groove formed to correspond to the locking protrusion, and the locking protrusion may be coupled to the locking groove.

When the knob is slidably movable, the knob may be in contact with or released from the rotating block.

The first link body may be moved by a pressure applied in the first direction in a state in which the knob is in contact with the rotating block.

The duct housing may include a Coanda surface disposed on an upper side and a lower side of the first wing.

A rotation direction of the first wing and a rotation direction of the handle unit may be opposite to each other.

Another aspect of the present disclosure provides an air vent for an automobile including a duct housing configured to guide a flow of air and having an outlet formed therein, a first wing disposed inside the duct housing, a second wing disposed inside the duct housing to be spaced apart from the first wing, a link including a first link body disposed inside the first wing and a second link body passing through the first wing to be coupled to the second wing, and a handle unit coupled to the link and configured to control a movement of the link, i the first wing includes a link hole in which the second link body is disposed, and the link hole is formed to have a predetermined width to enable a left-right movement of the second link body.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
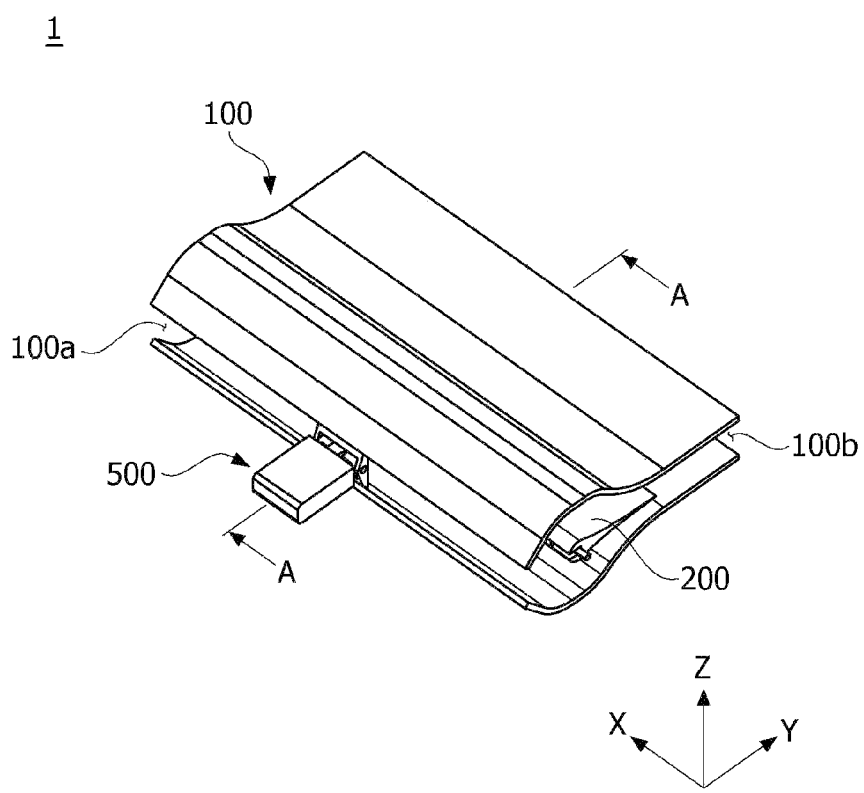
FIG. 1 is a perspective view of an air vent for an automobile according to an embodiment.

The present disclosure may be modified in various forms and have various embodiments, and thus particular embodiments thereof will be illustrated in the accompanying drawings and described in the detailed description. However, it should be understood that there is no intention to limit the present disclosure to the particular embodiments disclosed, and, on the contrary, the present disclosure is to cover all modifications, equivalents, and alternatives falling within the spirit and scope of the present disclosure.

It should be understood that, although the terms including ordinal numbers such as first, second, and the like may be used herein to describe various elements, the elements are not limited by the terms. The terms are used only for the purpose of distinguishing one component from another component. For example, without departing from the scope of the present disclosure, a second component may be referred to as a first component, and similarly, a first component may also be referred to as a second component. The term "and/or" includes a combination of a plurality of related listed items or any one item of the plurality of related listed items.

When a component is referred to as being "connected" or "coupled" to another component, it may be directly connected or coupled to another component, but it should be understood that still another component may be present between the component and another component. In contrast, when a component is referred to as being "directly connected," or "directly coupled" to another component, it should be understood that still another component may not be present between the component and another component.

In descriptions of the embodiment, when one component is referred to as being formed "on or under" another component, two components may be in direct contact with each other or at least one still another component may be indirectly formed between the two components. Further, the term "on or under" may refer to not only an upward direction but also a downward direction based on one component.

The terms used herein are for the purpose of describing particular embodiments only and are not intended to be limiting to the present disclosure. As used herein, singular forms are intended to include plural forms as well, unless the context clearly indicates otherwise. In the present application, it should be understood that the terms "comprise," "comprising," "include," and/or "including", when used in this specification, specify the presence of stated features, integers, steps, operations, elements, components and/or groups thereof but do not preclude the presence or addition of one or more other features, integers, steps, operations, elements, components and/or groups thereof.

Terms, such as those defined in commonly used dictionaries, should be interpreted as having a meaning that is consistent with their meaning in the context of the relevant art and will not be interpreted in an idealized or overly formal sense unless clearly defined in the present application. It should be understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present disclosure will be described in detail with reference to the accompanying drawings. Regardless of reference numerals, like numbers refer to like elements throughout the description of the figures, and the description of the same elements will be not reiterated.

An air vent for an automobile according to an embodiment is connected to an air conditioner (not shown) of an automobile and may control an air direction of conditioned air to supply the conditioned air to an interior of the automobile.

Figure 2:
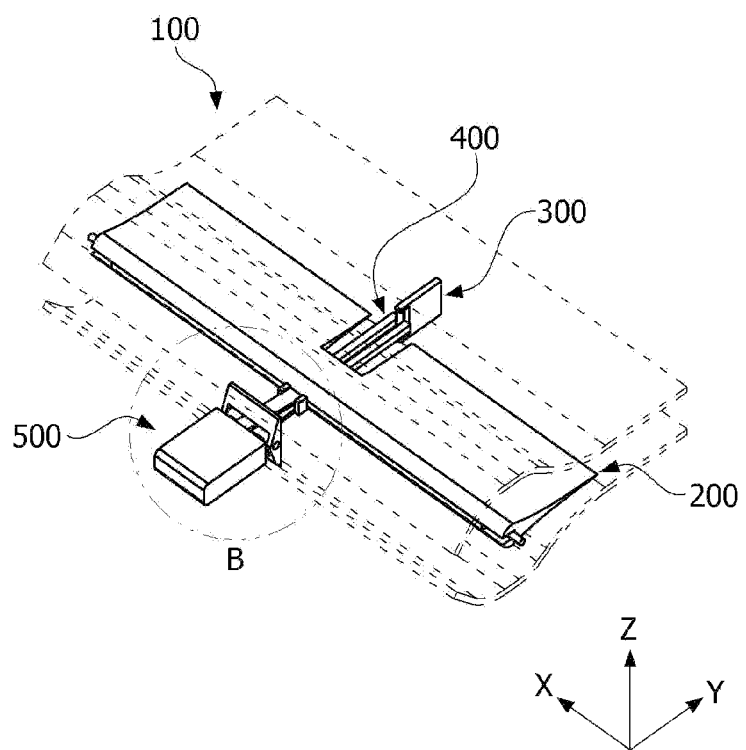
FIG. 2 is a perspective view illustrating the remaining components except for a duct housing from an air vent for an automobile.

FIG. 1 is a perspective view of an air vent for an automobile according to an embodiment, and FIG. 2 is a perspective view illustrating the remaining components except for a duct housing from the air vent for an automobile.

In FIGS. 1 and 2, an X direction may refer to a first direction, a vehicle width direction, or a left-right direction, a Y direction may refer to a second direction, a forward-backward direction, or an air flow direction, and a Z direction may refer to a third direction or an up-down direction. In addition, the up-down direction may include an upward direction toward a ceiling of the automobile and a downward direction opposite to the upward direction.

Referring to FIGS. 1 and 2, an air vent 1 for an automobile may include a duct housing 100, a first wing 200, a second wing 300, a link 400, and a handle unit 500.

Figure 3:
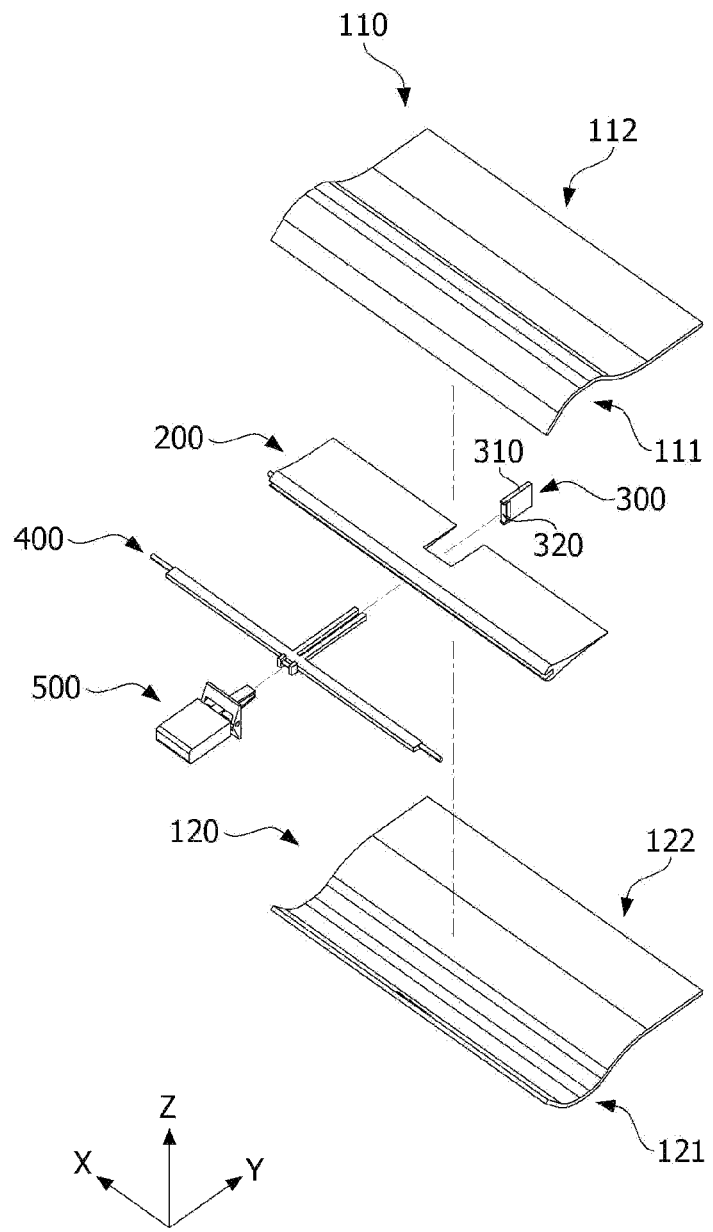
FIG. 3 is an exploded perspective view of the air vent for an automobile according to an embodiment.
Figure 4:
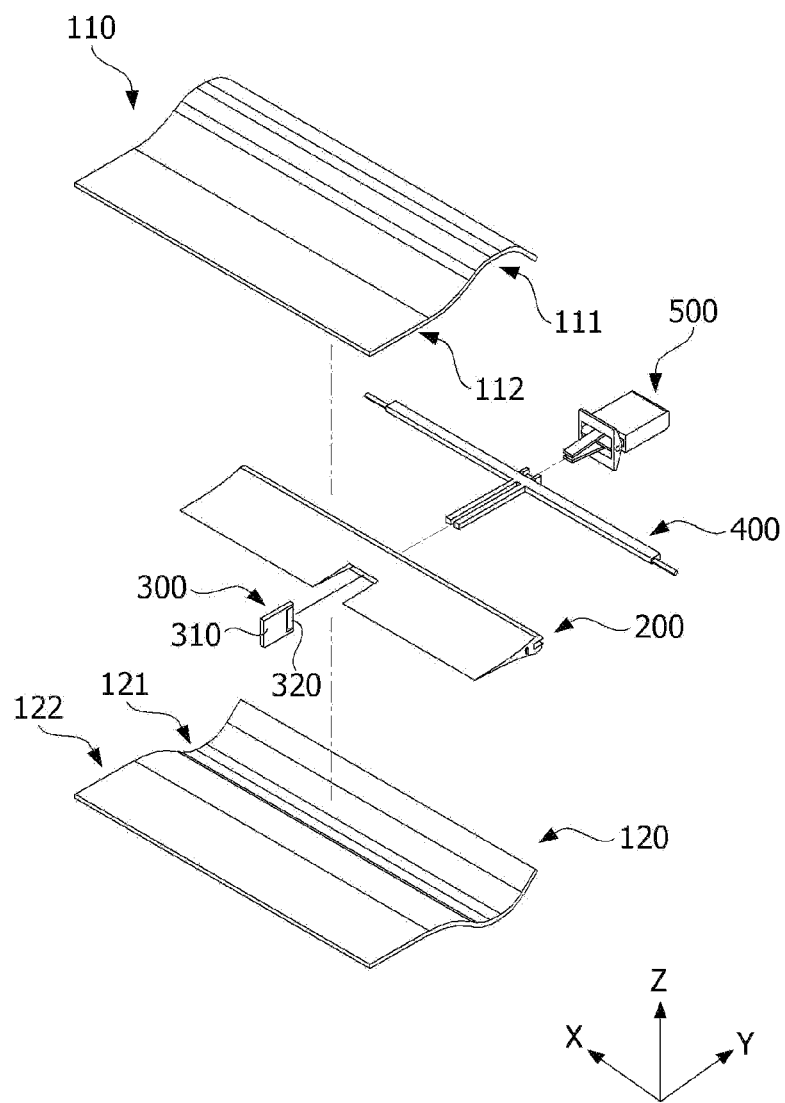
FIG. 4 is a rear-side exploded perspective view of the air vent for an automobile according to an embodiment.
Figure 5:
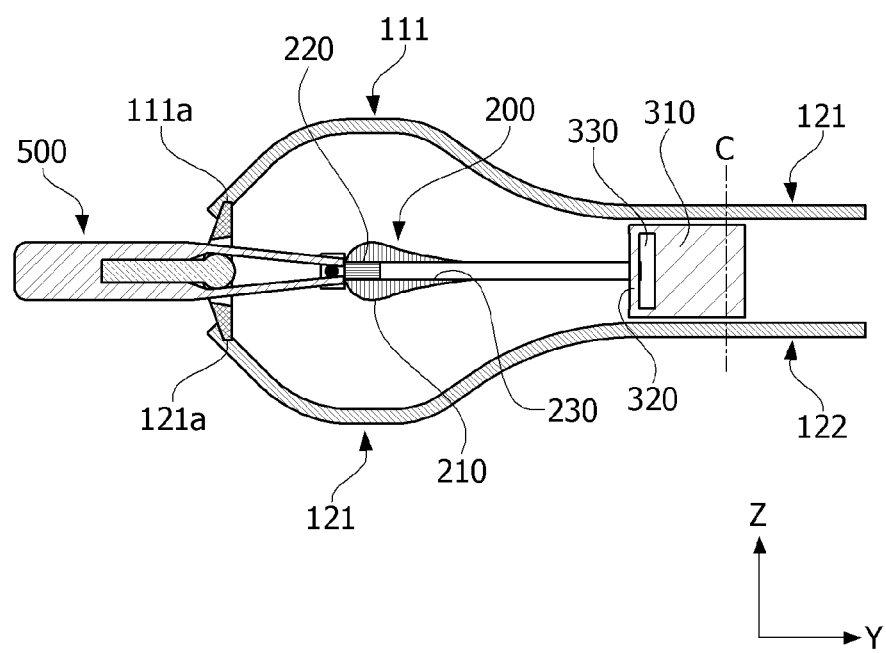
FIG. 5 is a cross-sectional view taken along line A-A of FIG. 1.

FIG. 3 is an exploded perspective view of the air vent for an automobile according to an embodiment, FIG. 4 is a rear-side exploded perspective view of the air vent for an automobile according to an embodiment, and FIG. 5 is a cross-sectional view taken along line A-A of FIG. 1.

Referring to FIGS. 1 and 3 to 5, the duct housing 100 may be connected to an air conditioner (not shown) and may guide air that is conditioned through the air conditioner (not shown) to the interior of the automobile.

The duct housing 100 may include a first housing plate 110 and a second housing plate 120.

The first housing plate 110 and the second housing plate 120 may be disposed to be spaced apart from each other.

The first housing plate 110 may guide air that is supplied from the air conditioner (not shown).

The first housing plate 110 may include a first flow path 111 and a second flow path 112.

The first flow path 111 includes a Coanda surface that forms a Coanda effect, and the Coanda surface may guide the air to the interior of the automobile. Here, the Coanda surface formed in the first flow path 111 may be a curved surface that is formed to be concave upward.

The first flow path 111 may include a first fixing groove 111a formed on a side of an outlet 100a. The first fixing groove 111a may be disposed on an inner surface of the first flow path 111. The first fixing groove 111a may be formed to be concave upward. In addition, some components of the handle unit 500 may be coupled to the first fixing groove 111a. Accordingly, the first fixing groove 111a may support the handle unit 500.

The second flow path 112 may be connected to the air conditioner (not shown). The second flow path 112 extends from an end portion of the first flow path 111 in the Y direction. The second flow path 112 may extend in a rectangular shape toward the air conditioner (not shown) from the end portion of the first flow path 111, but the present disclosure is not limited thereto.

The second housing plate 120 may guide the air together with the first housing plate 110.

The second housing plate 120 may include a third flow path 121 and a fourth flow path 122.

The third flow path 121 may be formed in a shape symmetrical to the first flow path 111. The third flow path 121 includes a Coanda surface that forms a Coanda effect, and the Coanda surface may guide the air to the interior of the automobile. Here, the Coanda surface formed in the third flow path 121 may be a curved surface that is formed to be concave downward.

The third flow path 121 may be disposed to be spaced apart from the first flow path 111 in the Z direction. Accordingly, the outlet 100a may be formed between an end portion of the third flow path 121 and an end portion of the first flow path 111. In addition, the air may be discharged to the interior of the automobile through the outlet 100a. Here, a width of the outlet 100a in the Z direction may be 20 mm or less.

Further, the handle unit 500 may be disposed in the outlet 100a.

The third flow path 121 may include a second fixing groove 121a formed on a side of the outlet 100a. The second fixing groove 121a may be disposed on an inner surface of the third flow path 121. The second fixing groove 121a may be formed to be concave downward. In addition, some components of the handle unit 500 may be coupled to the second fixing groove 121a. Accordingly, the first fixing groove 111a and the second fixing groove 121a may support the handle unit 500.

The fourth flow path 122 may be connected to the air conditioner (not shown). The fourth flow path 122 extends from an end portion of the third flow path 121 in the Y direction. The fourth flow path 122 may extend in a rectangular shape toward the air conditioner (not shown) from the end portion of the third flow path 121, but the present disclosure is not limited thereto.

The fourth flow path 122 may be disposed to be spaced apart from the second flow path 112 in the Z direction. Accordingly, an inlet 100b through which the air supplied from the air conditioner (not shown) may be introduced may be formed at one side of the duct housing 100.

The duct housing 100 may further include a third housing plate (not shown). The third housing plate (not shown) may cover a gap between an end portion of the first housing plate 110 in the X direction and an end portion of the second housing plate 120 in the X direction.

Figure 6:
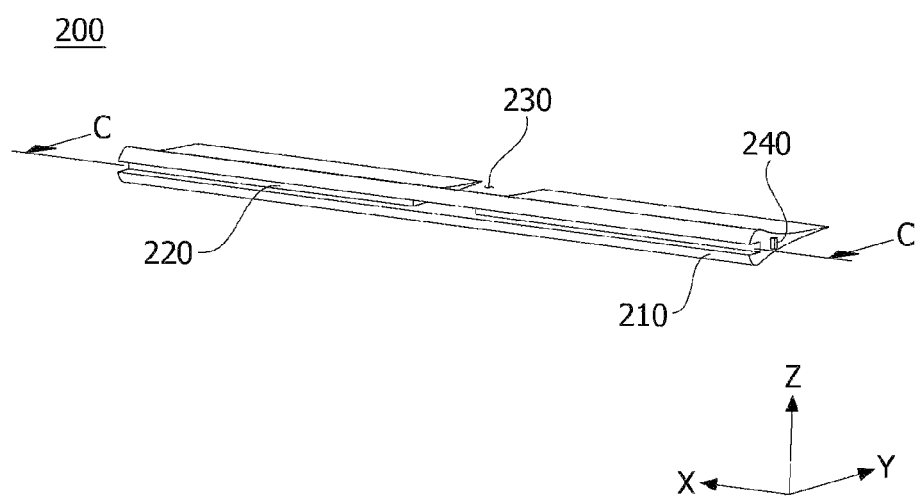
FIG. 6 is a perspective view illustrating a first wing.
Figure 7:
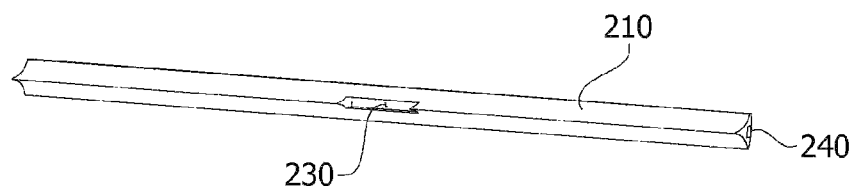
FIG. 7 is a view illustrating the first wing viewed from a rear side.
Figure 8:
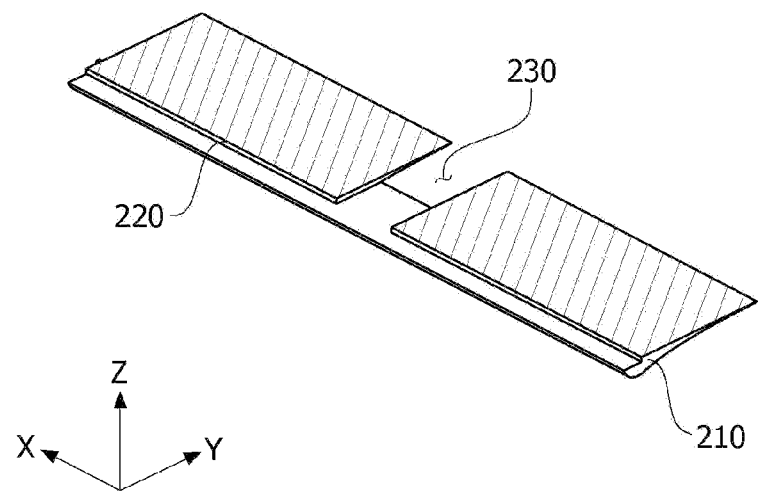
FIG. 8 is a cross-sectional view taken along line C-C of FIG. 6.
Figure 9:
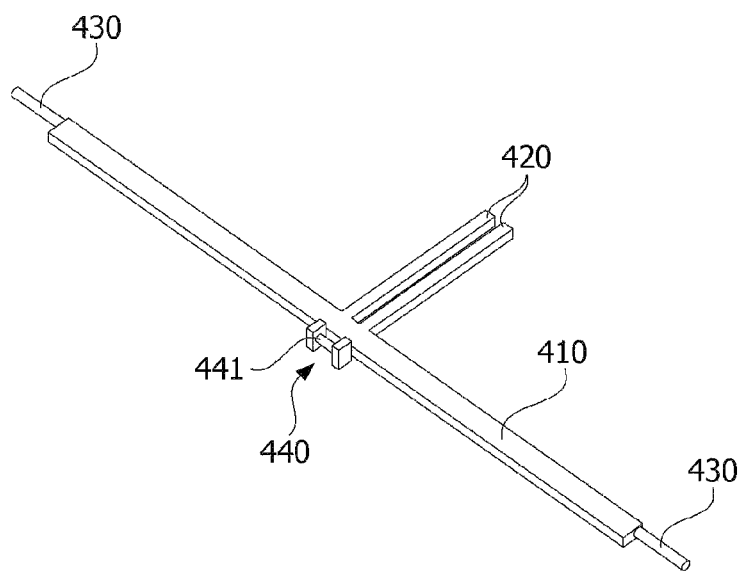
FIG. 9 is a perspective view illustrating a link.
Figure 10:
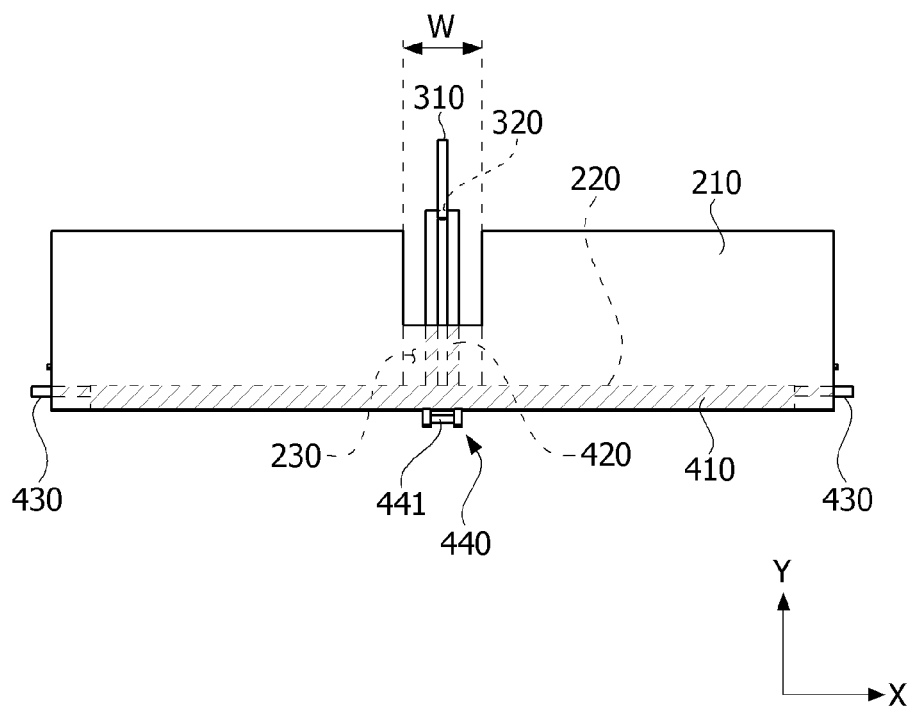
FIG. 10 is a plan view illustrating a state in which the link is coupled to the first wing and a second wing.
Figure 11:
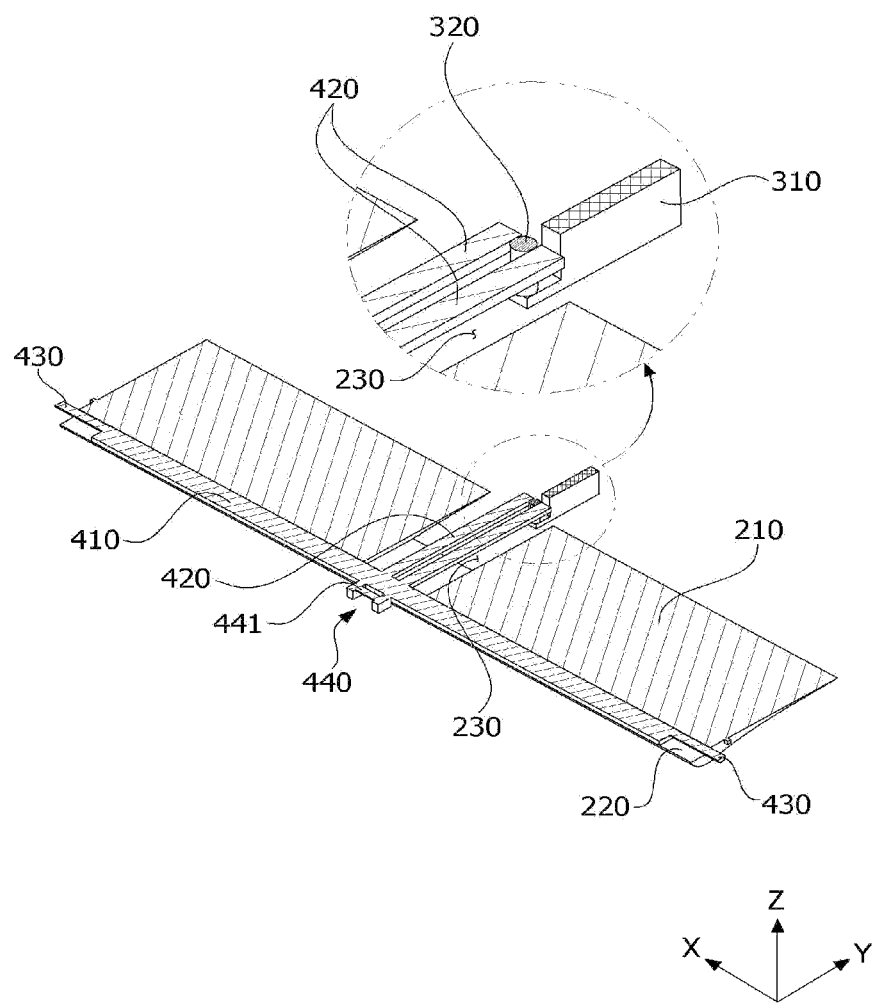
FIG. 11 is a cross-sectional view illustrating the state in which the link is coupled to the first wing and the second wing.

FIG. 6 is a perspective view illustrating the first wing, FIG. 7 is a view illustrating the first wing viewed from a rear side, FIG. 8 is a cross-sectional view taken along line C-C of FIG. 6, FIG. 9 is a perspective view illustrating the link, FIG. 10 is a plan view illustrating a state in which the link is coupled to the first wing and the second wing, and FIG. 11 is a cross-sectional view illustrating the state in which the link is coupled to the first wing and the second wing.

Referring to FIGS. 5 to 8, the first wing 200 may be disposed inside the duct housing 100.

The first wing 200 may rotate in conjunction with the movement of the link 400 and the handle unit 500. Accordingly, a direction of air guided by the duct housing 100 may be controlled by the first wing 200 so that the air is discharged through the outlet 100a. For example, an upward or downward flow of air may be controlled by the first wing 200.

The first wing 200 may include a first wing body 210, a link groove 220, and a link hole 230.

The first wing body 210 is disposed between the first flow path 111 and the third flow path 121. The link 400 may be coupled to the first wing body 210. The first wing body 210 may control a flow direction of air moving along an inside of the duct housing 100 while rotating in conjunction with the movement of the link 400.

The link groove 220 is formed on one side of the first wing body 210. As shown in FIG. 6, the link groove 220 may be formed on a downstream side of the first wing body 210. At this point, the link groove 220 may be formed along the X direction. Accordingly, the link groove 220 may guide a left-right movement of the link 400. Here, the downstream may be distinguished from upstream on the basis of the flow of air, and may mean the outlet 100a side. Some components of the link 400 may be coupled to the link groove 220.

The link hole 230 may be formed to pass through the first wing body 210.

The link hole 230 may be disposed from a portion of the link groove 220 in a direction from the first flow path 111 toward the second flow path 112.

As shown in FIG. 10, the link hole 230 is formed to have a predetermined width to enable a left-right movement of a second link body 420. As shown in FIGS. 6 and 8, the link hole 230 may be formed to communicate with one side of the link groove 220.

As shown in FIGS. 6 and 7, the first wing 200 may further include a protruding rib 240.

The protruding rib 240 may be formed to protrude from an end portion of the first wing 200 in the X direction. The protruding rib 240 may be in contact with the third housing plate (not shown) of the duct housing 100. Since the protruding rib 240 is disposed to be in contact with the third housing plate (not shown), the movement of the first wing 200 in the leftward or rightward direction may be prevented in advance even when the link 400 moves left and right. Accordingly, damage caused by direct contact of the first wing body 210 with the third housing plate (not shown) may be prevented.

Referring to FIGS. 2, 3, and 5, the second wing 300 may be disposed inside the duct housing 100. The second wing 300 may be disposed to be spaced apart from the first wing 200. Specifically, the second wing 300 may be disposed upstream (a front side) than the first wing 200 on the basis of the flow direction of air. The second wing 300 may be disposed to intersect with the first wing 200 when viewed from the outlet 100a.

The second wing 300 may include a second wing body 310 and a guide member 320.

The second wing body 310 may be disposed between the second flow path 112 and the fourth flow path 122. The second wing body 310 may be formed in a plate shape.

The guide member 320 may be disposed at an end portion of the second wing body 310. The guide member 320 is disposed in the Z direction and may be formed in a cylindrical shape. As shown in FIG. 11, an end portion of the second link body 420 may be coupled to the guide member 320. Accordingly, the guide member 320 may guide an up-down movement of the second link body 420.

The second wing 300 may be linked to the movement of the link 400 in the X direction, i.e., in the left-right direction. As shown in FIG. 5, a rotation center C of the second wing 300 may be disposed in the front of the guide member 320. Accordingly, the second wing 300 may rotate about the rotation center C along a moving direction of the guide member 320.

Meanwhile, the second wing 300 may further include a hole 330 formed in the second wing body 310.

When the second wing 300 rotates according to the left-right movement of the second link body 420, the hole 330 may prevent rotational interference of the second link body 420 caused by the second wing body 310.

Referring to FIGS. 2 and 9 to 11, the link 400 may transmit the movement of the handle unit 500 to at least one of the first wing 200 and the second wing 300. The link 400 may be coupled to the first wing 200 and the second wing 300. In addition, one side of the link 400 may be coupled to the handle unit 500. Accordingly, the movement of the link 400 may be controlled by the handle unit 500.

The link 400 may include a first link body 410, the second link body 420, and a first rotating shaft 430. In addition, the link 400 may further include a coupling block 440 formed for coupling of the link 400 and the handle unit 500.

As shown in FIG. 10, the first link body 410 may be coupled to the link groove 220. Here, the first link body 410 may be disposed in the link groove 220 to be movable in the X direction, which is the left-right direction.

The second link body 420 may extend toward the second wing 300 from one side of the first link body 410. As shown in FIG. 10, the second link body 420 may be disposed inside the link hole 230. The second link body 420 may be provided as two second link body members that are disposed to be spaced apart from each other in the X direction. Here, the second link body member may be formed in a bar shape. The end portion of the second link body 420 may be coupled to the guide member 320 to be slidably movable in the Z direction. For example, since the guide member 320 may be disposed between the second link body members, the second link body 420 may move in the Z direction.

The first rotating shaft 430 may protrude from an end portion of the first link body 410 in the X direction. The first rotating shaft 430 may be rotatably coupled to the third housing plate (not shown).

A rotation center of the first rotating shaft 430 and a rotation center of the first wing body 210 may be equal to each other. Accordingly, the first wing 200 may rotate about the first rotating shaft 430 together with the first link body 410 in conjunction with the movement of the handle unit 500 in the up-down direction.

The coupling block 440 may be integrally formed with the first link body 410. The coupling block 440 may be disposed in the rear of the first link body 410. The coupling block 440 may be disposed to be exposed to the outside of the first wing 200. The coupling block 440 may be coupled to the handle unit 500.

The coupling block 440 may include coupling members 441 disposed in the X direction. The coupling members 441 may be coupled to some components of the handle unit 500. The coupling members 441 may be rotatably supported by some components of the handle unit 500.

Figure 12:
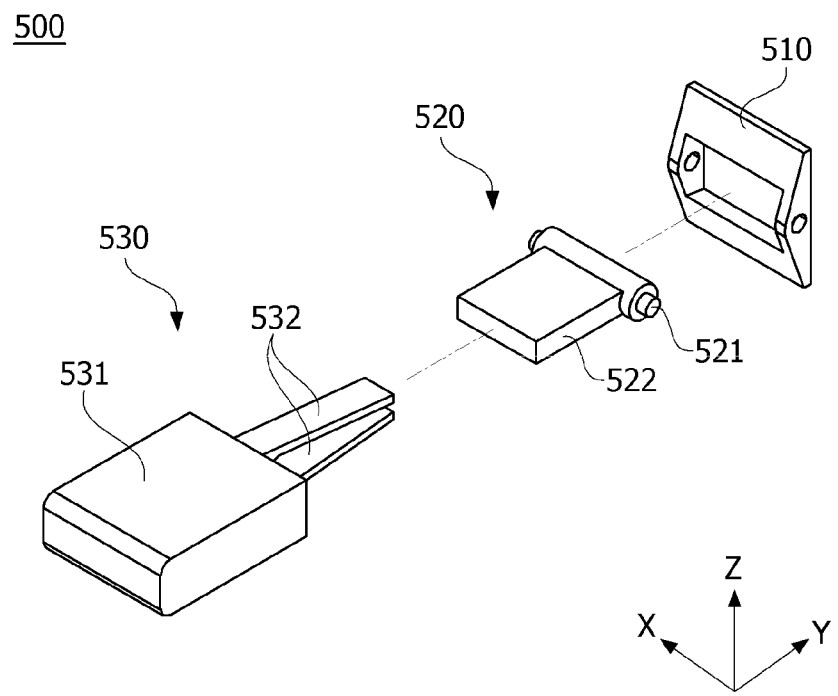
FIG. 12 is an exploded perspective view of a handle unit.
Figure 13:
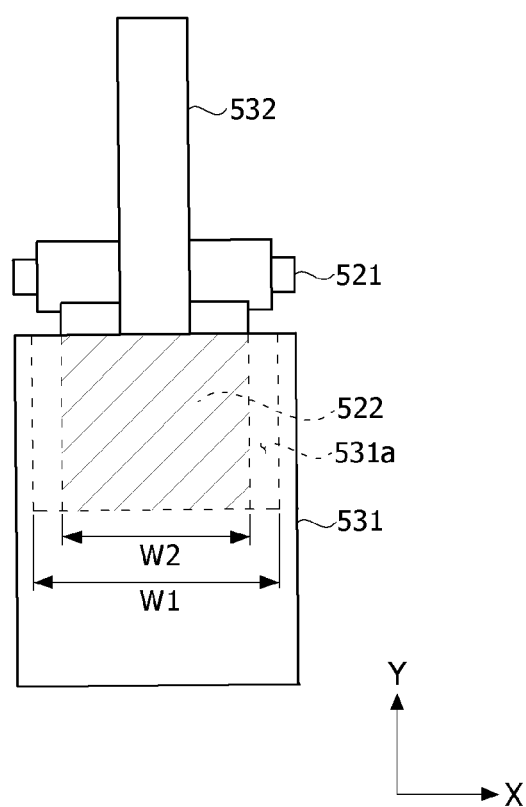
FIG. 13 is a view illustrating a state in which a knob is coupled to a rotating block in a plane view.
Figure 14:
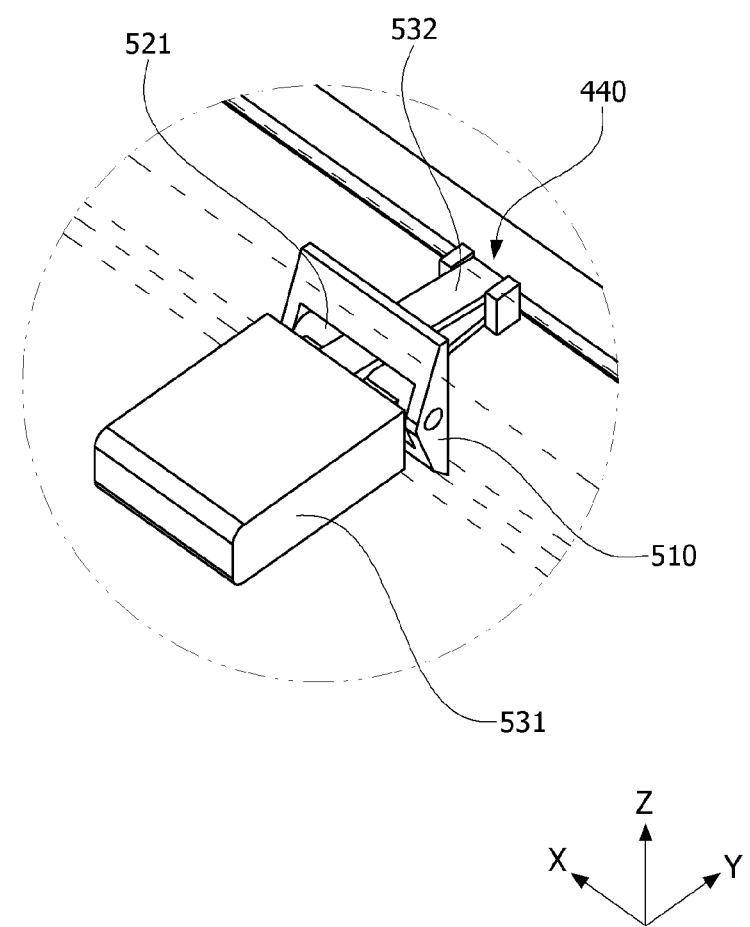
FIG. 14 is an enlarged view of portion B of FIG. 2.

FIG. 12 is an exploded perspective view of the handle unit, FIG. 13 is a view illustrating a state in which a knob is coupled to a rotating block in a plan view, and FIG. 14 is an enlarged view of portion B of FIG. 2.

Referring to FIGS. 1, 2, and 12 to 14, the handle unit 500 may be coupled to the link 400 to control the movement of the link 400.

The handle unit 500 may include a fixed block 510, a rotating block 520, and a knob 530.

The fixed block 510 may be disposed on the outlet 100a of the duct housing 100. Specifically, the fixed block 510 may be coupled and fixed to the first fixing groove 111a of the first housing plate 110 and the second fixing groove 121a of the second housing plate 120. The fixed block 510 may include a hole formed such that the rotating block 520 may be disposed therein. Since the fixed block 510 supports the first housing plate 110 and the second housing plate 120, the first housing plate 110 and the second housing plate 120 may be maintained in a state of being spaced apart from each other.

The rotating block 520 may be rotatably coupled to the fixed block 510.

The rotating block 520 may include a second rotating shaft 521 and a rotating body 522 integrally formed to protrude from an outer circumferential surface of the second rotating shaft 521.

The second rotating shaft 521 may be rotatably coupled to the fixed block 510. The second rotating shaft 521 may rotatably support the rotating body 522 that is linked to the movement of the knob 530 in the up-down direction.

The rotating body 522 may be formed in a plate shape. The rotating body 522 may rotate in conjunction with the movement of the knob 530 in the up-down direction. For example, since a portion of the rotating body 522 is disposed inside the knob 530, the rotating body 522 may rotate in conjunction with the rotation of the knob 530.

Further, the rotating body 522 may guide the knob 530 to be slidably movable in the left-right direction.

The knob 530 may be coupled to the rotating body 522. The knob 530 may include a first knob body 531 and a second knob body 532.

The first knob body 531 may be coupled to the rotating body 522 to be slidably movable in the X direction.

The first knob body 531 may include a block receiving groove 531a formed to receive the rotating block 520 therein. The block receiving groove 531a may receive a portion of the rotating body 522.

The second knob body 532 may protrude from an end portion of the first knob body 531 toward the coupling member 441. The second knob body 532 may be disposed to be inclined toward the coupling member 441 from the end portion of the first knob body 531. An end portion of the second knob body 532 may be rotatably coupled to the coupling member 441.

As shown in FIG. 13, a first width W1 (in the X direction) of the block receiving groove 531a may be formed to be greater than a second width W2 (in the X direction) of the rotating body 522.

In addition, the movement of the knob 530 may be guided by the rotating body 522 that is received in the block receiving groove 531a. That is, the knob 530 may move in the left-right direction by being guided by the rotating body 522. In addition, when the first knob body 531 slidably moves in the left-right direction, the first knob body 531 may be in contact with or released from the rotating body 522.

For example, when the first knob body 531 is slidably movable in one of the leftward or rightward direction by an operation of a user, a left inner surface or a right inner surface of the first knob body 531 comes into contact with one of a left side surface and a right side surface of the rotating body 522. In this state, when a pressing force is further transmitted to the first knob body 531, the first knob body 531 pushes the rotating body 522 in a sliding direction. Accordingly, the rotating body 522 may transmit the pressing force to the second knob body 532 and the link 400.

Further, the first knob body 531 may be slidably movable in a direction opposite to the direction, in which the first knob body 531 is slid, by an operation of the user in a state in which the first knob body 531 is in contact with the rotating body 522. Accordingly, the state in which the first knob body 531 is in contact with the rotating body 522 may be released.

A rotation direction of the handle unit 500 may be opposite to a rotation direction of the link 400.

For example, the link 400 rotates about the first rotating shaft 430, and the knob 530 rotates about the second rotating shaft 521. Here, the coupling member 441 is in a state of being supported by the second knob body 532. In addition, the coupling member 441 rotates in the same direction as the rotation direction of the second knob body 532 in conjunction with the rotation of the second knob body 532. In addition, the link 400 rotates in a direction different from the rotation direction of the second knob body 532 in conjunction with the rotation of the coupling member 441. Accordingly, the link 400 and the knob 530 rotate respectively about the first rotating shaft 430 and the second rotating shaft 521 in directions opposite to each other.

Accordingly, when the first wing 200 is rotated by an operation of the handle unit 500, the air may be discharged upward or downward in the interior of the automobile.

In the air vent 1 for an automobile according to an embodiment, the first wing 200 may be disposed between the first flow path 111 and the third flow path 121. Accordingly, a restriction in a rotation radius of the first wing 200 may be eliminated.

In addition, since the air vent 1 for an automobile uses the link 400, the necessity of disposing the first wing 200 close to the outlet 100a may be reduced.

Furthermore, a position at which the Coanda surface is formed may be controlled through the link 400.

Accordingly, in the air vent 1 for an automobile, the width of the outlet 100a may be reduced and a degree of design freedom of a dashboard of the automobile may be improved.

Further, the air vent 1 for an automobile according to an embodiment may have a structure in which the movement of each of the first wing 200 and the second wing 300 is controlled by one link 400. Accordingly, in the air vent 1, through one link 400 disposed inside the first wing 200, the number of parts may be reduced and an internal structure of the air vent 1 may be simplified. Accordingly, through the above structure, manufacturing costs or assembly costs of the air vent 1 may be reduced.

Hereinafter, a process of supplying the air transmitted from the air conditioner (not shown) to a lower side of the interior of the automobile through the air vent for an automobile will be described.

Figure 15A:
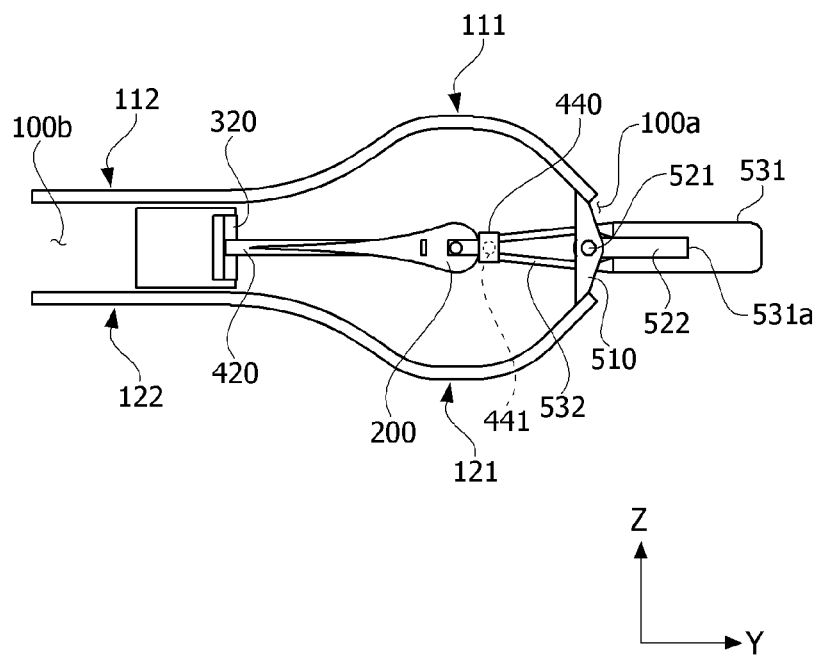
FIG. 15A is a cross-sectional view illustrating a default state of the air vent for an automobile.
Figure 15B:
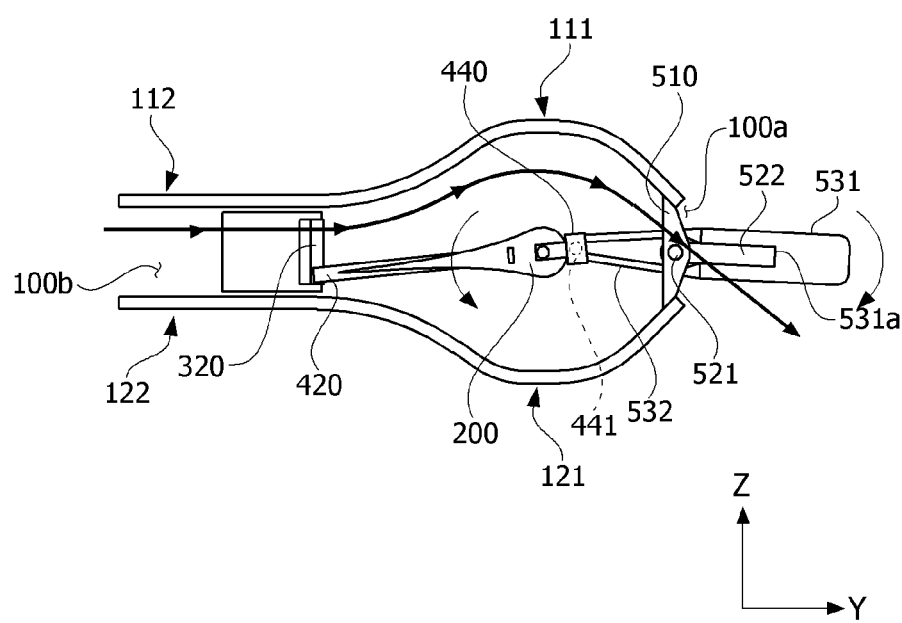
FIG. 15B is a cross-sectional view illustrating a state in which the first wing, the link, and the handle unit are rotated.

FIG. 15A is a cross-sectional view illustrating a default state of the air vent for an automobile, and FIG. 15B is a cross-sectional view illustrating a state in which the first wing, the link, and the handle unit are rotated.

Referring to FIGS. 15A and 15B, the air vent 1 for an automobile may discharge air to the lower side of the interior of the automobile through the movement of the knob 530.

As shown in FIG. 15A, the first wing 200 and the link 400 are not rotated about the first rotating shaft 430 in a default state in which each of the components of the air vent 1 for an automobile is not moved upward or downward. In addition, in the default state, the rotating block 520 and the knob 530 are disposed in a state of not being rotated about the second rotating shaft 521.

As shown in FIG. 15B, when the first knob body 531 is rotated downward by an operation of the user, the second knob body 532 rotates upward about the second rotating shaft 521. At the same time, the coupling member 441 coupled to the second knob body 532 is linked to the movement of the second knob body 532 and rotated upward about the first rotating shaft 430.

In this process, the first wing 200 and the first link body 410 rotate about the first rotating shaft 430, and the end portion of the second link body 420 is disposed moved by sliding below the guide member 320.

Accordingly, the first wing 200 is disposed to be inclined downward with respect to a direction toward the inlet 100b from the outlet 100a.

Air passing through the inlet 100b is guided by the first wing 200 and moved upward toward the first flow path 111 by a Coanda effect. The air flows in a state of being in contact with the first flow path 111.

The air guided by the first wing 200 and the first flow path 111 may be discharged toward the lower side of the interior of the automobile by passing through the outlet 100a.

Although the air is illustrated in FIG. 15B as being supplied to the lower side of the interior of the automobile through the air vent 1 for an automobile, the present disclosure is not limited thereto. For example, the knob 530 may be rotated upward to discharge the air toward an upper side of the interior of the automobile.

Hereinafter, a process of supplying the air transmitted from the air conditioner (not shown) to a right side of the interior of the automobile will be described.

Figure 16A:
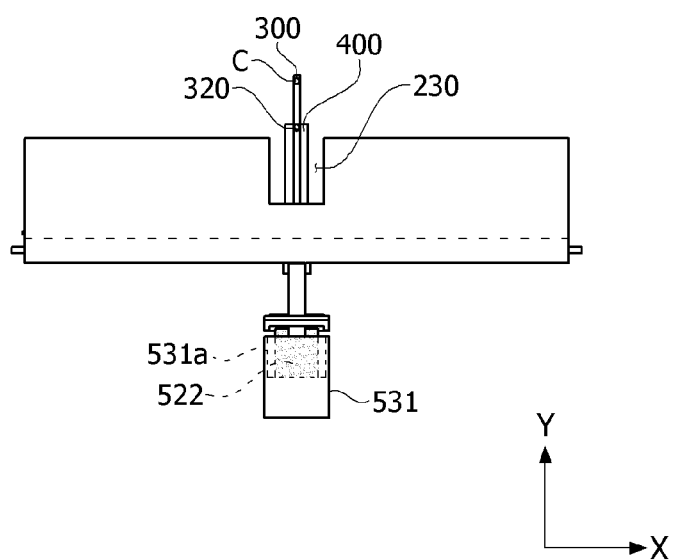
FIG. 16A is a plan view illustrating the default state of the air vent for an automobile.
Figure 16B:
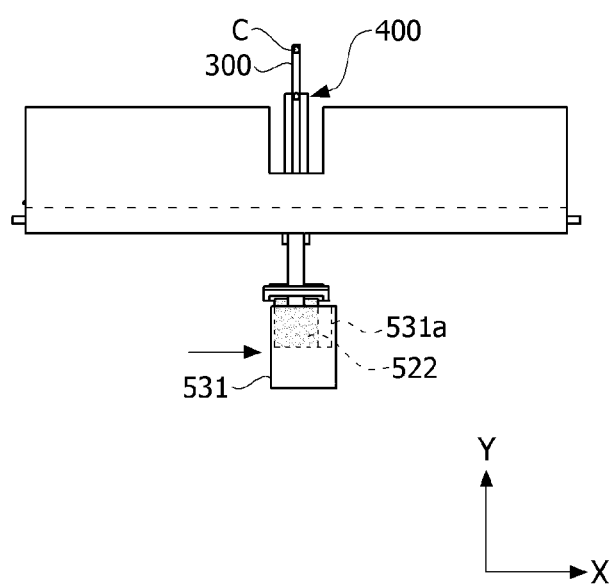
FIG. 16B is a plan view illustrating a state in which a first knob body is in contact with a rotating body.
Figure 16C:
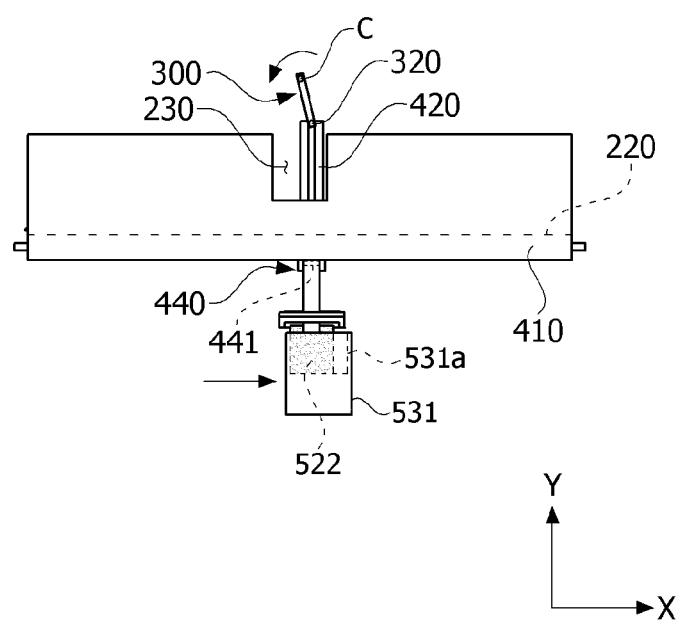
FIG. 16C is a plan view illustrating a state in which the second wing is rotated.

FIG. 16A is a plan view illustrating the default state of the air vent for an automobile, FIG. 16B is a plan view illustrating a state in which the first knob body is in contact with the rotating body, and FIG. 16C is a plan view illustrating a state in which the second wing is rotated.

Referring to FIGS. 16A to 16C, the air vent 1 for an automobile may supply conditioned air to the right side of the interior of the automobile through the movement of the knob 530 in the left-right direction.

As shown in FIG. 16A, the air vent 1 for an automobile is maintained in the default state when there is no operation by the user. In the default state, all of the second wing 300, the second link body 420, and the knob 530 are disposed in a straight line.

As shown in FIG. 16B, when the first knob body 531 is moved to the right side by an operation of the user from the default state, the first knob body 531 may be in contact with the rotating body 522 that is received in the block receiving groove 531a.

As shown in FIG. 16C, when the user applies more pressure to the first knob body 531 while the first knob body 531 is in contact with the rotating body 522, the first knob body 531 further moves the rotating body 522 to the right side.

The second knob body 532 transmits the pressing force to the coupling block 440 in conjunction with the movement of the first knob body 531.

When the pressing force is transmitted to the coupling block 440, the first link body 410 moves inside the link groove 220 in the rightward direction. In addition, the second link body 420 protruding from the first link body 410 moves inside the link hole 230 in the rightward direction.

Since the end portion of the second link body 420 is in a state of being coupled to the guide member 320, the second wing 300 may be linked to the movement of the second link body 420. Accordingly, the second wing 300 rotates in the rightward direction (counterclockwise) using the rotation center C as a central axis.

Referring to FIG. 16C, air flowing into the inlet 100b is guided in the rightward direction by the second wing 300. Accordingly, the air may be supplied in the rightward direction of the interior of the automobile through the outlet 100a.

Although the air is illustrated in FIG. 16C as being supplied to the right side of the interior of the automobile through the air vent 1 for an automobile, the present disclosure is not limited thereto. For example, the knob 530 may be moved in the leftward direction to discharge the air toward a left side of the interior of the automobile.

Figure 17A:
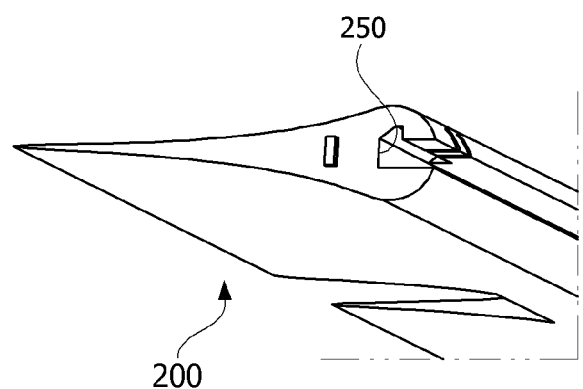
FIG. 17A is a view illustrating a locking groove.
Figure 17B:
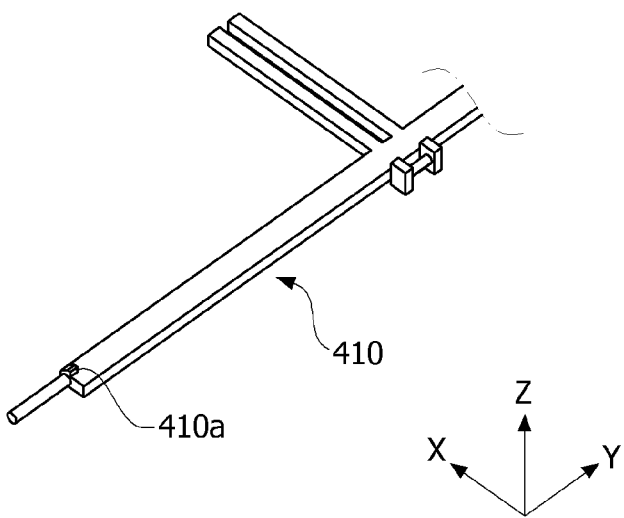
FIG. 17B is a view illustrating a locking protrusion.

FIG. 17A is a view illustrating a locking groove, and FIG. 17B is a view illustrating a locking protrusion.

Figure 18:
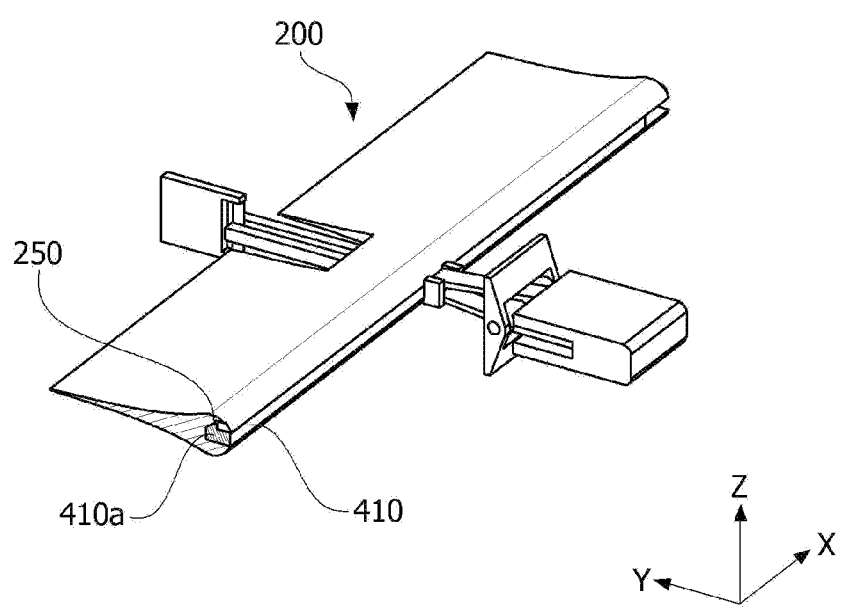
FIG. 18 is a view illustrating a state in which the locking protrusion is coupled to the locking groove.

Referring to FIGS. 17A, 17B, and 18, the air vent 1 for an automobile may further include a locking protrusion 410a formed on the first link body 410 and a locking groove 250 formed on the first wing 200.

As shown in FIGS. 17A and 18, the locking groove 250 is concavely formed on a portion of the first wing 200.

As shown in FIGS. 17B and 18, the locking protrusion 410a may protrude from an outer surface of the first link body 410 to correspond to the locking groove 250. The locking protrusion 410a may be coupled to the locking groove 250. The coupling of the locking protrusion 410a and the locking groove 250 may prevent the first link body 410 from being separated. The first link body 410 may be stably maintained in a state in which the first link body 410 is disposed inside the first wing 200 by the coupling of the locking groove 250 and the locking protrusion 410a.

According to an embodiment, it is possible to achieve slimness of an outlet through a link disposed inside a first wing. Accordingly, according to the embodiment, it is possible to improve a degree of design freedom of an automobile dashboard disposed in an interior of an automobile.

Further, according to the embodiment, a user can easily control a wind direction by implementing a coupling structure of a knob and a link that allows an operation of the knob to be simplified.

Further, according to the embodiment, it is possible to simplify an operation structure through the coupling structure, so that manufacturing costs or assembly costs of the product can be reduced.

Various and advantageous advantages and effects of the embodiments are not limited to the above descriptions and will be more easily understood in a process of describing specific embodiments of the present disclosure.

The present disclosure has been described above with reference to the embodiment of the present disclosure, but it should be understood by those skilled in the art that various changes and modifications may be made therein without departing from the spirit and scope of the present disclosure defined by the appended claims. Further, differences related to modifications and changes should be understood to be included in the scope of the present disclosure defined in the appended claims.

What is claimed is:

1. An air vent for an automobile, the air vent comprising:
 a duct housing configured to guide a flow of air and having an outlet formed therein;
 a first wing and a second wing disposed to be spaced apart from each other inside the duct housing;
 a link configured to control a rotation of each of the first wing and the second wing; and
 a handle unit coupled to the link and configured to control a movement of the link,
 wherein the link is disposed to be movable and rotatable inside the first wing,
 the link includes:
  a first link body disposed inside the first wing and disposed to be movable in a first direction that is a left-right direction; and
  a second link body extending toward the second wing from the first link body,
 the first wing includes:
  a first wing body;
  a groove defined on one side of the first wing body; and
  a link hole passing through the first wing body in a second direction that is a flow direction of the air, and
 the first link body is disposed in the groove such that the first link body is sandwiched between portions of the first wing body.

2. The air vent of claim 1, wherein when viewed from the outlet, the first wing and the second wing are disposed to cross each other.

3. The air vent of claim 1, wherein
 the link further includes a first rotating shaft protruding from an end portion of the first link body in the first direction, and the first link body rotates about the first rotating shaft in conjunction with a rotation of the handle unit about the first direction.

4. The air vent of claim 3, wherein
the link further includes a coupling block integrally formed with the first link body, and
a one-side end portion of the handle unit is rotatably disposed in the coupling block.

5. The air vent of claim 4, wherein
the handle unit includes:
a fixed block coupled to the outlet of the duct housing;
a rotating block rotatably coupled to the fixed block; and
a knob coupled to the rotating block and disposed to be slidably movable in the first direction with respect to the rotating block,
wherein an end portion of the knob is rotatably coupled to the coupling block.

6. The air vent of claim 5, wherein
the knob includes a block receiving groove formed to receive the rotating block therein,
wherein a width of the block receiving groove in the first direction is greater than a width of the rotating block in the first direction.

7. The air vent of claim 6, wherein when the knob is slidably movable, the knob is in contact with or released from the rotating block.

8. The air vent of claim 7, wherein the first link body is movable by a pressure applied in the first direction in a state in which the knob is in contact with the rotating block.

9. The air vent of claim 5, wherein
the duct housing further includes a fixing groove disposed on an inner surface thereof and extending on a side of the outlet,
wherein the fixing groove is coupled to the fixed block and supports the fixed block.

10. The air vent of claim 3, wherein the first wing rotates about the first rotating shaft in conjunction with a rotation of the first link body.

11. The air vent of claim 1, wherein
the second wing includes a second wing body and a guide member to which a one-side end portion of the second link body is coupled, and
the one-side end portion of the second link body is coupled to the guide member such that the second link body is slidably movable.

12. The air vent of claim 11, wherein the second wing includes a hole defined in the second wing body.

13. The air vent of claim 11, wherein the second wing rotates in conjunction with a movement of the second link body in the first direction.

14. The air vent of claim 1, wherein
the second link body is disposed in the link hole, and
the link hole has a predetermined width (W) in the first direction.

15. The air vent of claim 14, wherein
the second link body moves in conjunction with a movement of the first link body in the first direction within a range of the predetermined width (W).

16. The air vent of claim 1, wherein
the link further includes a locking protrusion protruding from the first link body,
the first wing further includes a locking groove disposed to receive the locking protrusion therein,
the locking protrusion is coupled to the locking groove, and
the locking groove has a portion further recessed from an inner surface of the groove defined on the one side of the first wing body.

17. The air vent of claim 1, wherein the duct housing includes a Coanda surface disposed on an upper side and a lower side of the first wing.

18. The air vent of claim 1, wherein a rotation direction of the first wing and a rotation direction of the handle unit are opposite to each other.

19. An air vent for an automobile, the air vent comprising:
a duct housing configured to guide a flow of air and having an outlet formed therein;
a first wing disposed inside the duct housing;
a second wing disposed inside the duct housing and spaced apart from the first wing;
a link including a first link body disposed inside the first wing and a second link body passing through the first wing to be coupled to the second wing; and
a handle unit coupled to the link and configured to control a movement of the link, and
wherein the first wing includes a link hole in which the second link body is disposed, and
the link hole has a predetermined width, wherein the second link body is movable in the link hole in a left-right direction,
the first wing includes:
a first wing body;
a groove defined on one side of the first wing body; and
the link hole passing through the first wing body in a flow direction of the air, and
the first link body is disposed in the groove such that the first link body is sandwiched between portions of the first wing body.

20. An air vent for an automobile, the air vent comprising:
a duct housing configured to guide a flow of air and having an outlet formed therein;
a first wing and a second wing disposed to be spaced apart from each other inside the duct housing;
a link configured to control a rotation of each of the first wing and the second wing; and
a handle unit coupled to the link and configured to control a movement of the link,
wherein the link is disposed to be movable and rotatable inside the first wing,
the link includes:
a first link body disposed inside the first wing and disposed to be movable in a first direction that is a left-right direction; and
a second link body extending toward the second wing from the first link body,
the second wing includes a second wing body and a guide member to which a one-side end portion of the second link body is coupled, the guide member extending in an up-down direction, and
the one-side end portion of the second link body is coupled to and in direct contact with the guide member such that the second link body is slidably movable along the guide member in the up-down direction.

\* \* \* \* \*